(12) United States Patent
Chen et al.

(10) Patent No.: US 8,032,270 B2
(45) Date of Patent: Oct. 4, 2011

(54) SYSTEMS AND METHODS FOR HANDLING THE DISPLAY AND RECEIPT OF AIRCRAFT CONTROL INFORMATION

(75) Inventors: Sherwin S. Chen, Bellevue, WA (US); Peter D. Gunn, Bellevue, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/946,145

(22) Filed: Nov. 15, 2010

(65) Prior Publication Data

US 2011/0060484 A1   Mar. 10, 2011

Related U.S. Application Data

(62) Division of application No. 12/197,784, filed on Aug. 25, 2008, now Pat. No. 7,844,372, which is a division of application No. 10/814,369, filed on Mar. 31, 2004, now Pat. No. 7,418,319.

(51) Int. Cl.
*G06F 19/00* (2006.01)

(52) U.S. Cl. ......................................................... 701/14

(58) Field of Classification Search ............... 701/1, 3–4, 701/13–18
See application file for complete search history.

(56) References Cited

U.S. PATENT DOCUMENTS

| | | | |
|---|---|---|---|
| 3,696,671 A | 10/1972 | Steigleder et al. | |
| 4,196,474 A | 4/1980 | Buchanan et al. | |
| 4,212,064 A | 7/1980 | Forsythe et al. | |
| 4,247,843 A | 1/1981 | Miller et al. | |
| 4,325,123 A | 4/1982 | Graham et al. | |
| 4,471,439 A | 9/1984 | Robbins et al. | |
| 4,642,775 A | 2/1987 | Cline et al. | |
| 4,729,102 A | 3/1988 | Miller, Jr. et al. | |
| 4,792,906 A | 12/1988 | King et al. | |
| 4,845,495 A | 7/1989 | Bollard et al. | |
| 4,860,007 A | 8/1989 | Konicke et al. | |
| 4,939,661 A | 7/1990 | Barker et al. | |
| 5,070,458 A | 12/1991 | Gilmore et al. | |
| 5,072,218 A | 12/1991 | Spero et al. | |
| 5,289,185 A | 2/1994 | Ramier et al. | |

(Continued)

FOREIGN PATENT DOCUMENTS

EP   1273987   1/2003

(Continued)

OTHER PUBLICATIONS

Hutchins, Edwin, "The Integrated Mode Management Interface," Department of Cognitive Science, University of California, San Diego, Sep. 17, 1996.

*Primary Examiner* — Yonel Beaulieu
(74) *Attorney, Agent, or Firm* — Perkins Coie LLP

(57) ABSTRACT

Methods and systems for handling aircraft control information are disclosed. A system in accordance with one embodiment of the invention includes a display medium coupleable to a flight manager, with the flight manager configured to receive and direct instructions for automatically controlling aircraft functions at a future time during flight of the aircraft. The system can further include a display controller coupled to the display medium to present at least one operator activatable element at the display medium and update information presented at the display medium when the operator activates the operator activatable element. For example, the operator activatable element can include an icon presented at a computer display screen, and can be activated by a keystroke.

20 Claims, 6 Drawing Sheets

U.S. PATENT DOCUMENTS

| | | |
|---|---|---|
| 5,329,277 A | 7/1994 | Dougan et al. |
| 5,416,705 A | 5/1995 | Barnett |
| 5,420,582 A | 5/1995 | Kubbat et al. |
| 5,475,594 A | 12/1995 | Oder et al. |
| 5,519,392 A | 5/1996 | Oder et al. |
| 5,523,949 A | 6/1996 | Agate et al. |
| 5,668,542 A | 9/1997 | Wright |
| 5,715,163 A | 2/1998 | Bang |
| 5,802,492 A | 9/1998 | DeLorme et al. |
| 5,844,503 A | 12/1998 | Riley et al. |
| 5,884,219 A | 3/1999 | Curtwright et al. |
| 5,916,297 A | 6/1999 | Griffin, III et al. |
| 5,978,715 A | 11/1999 | Briffe et al. |
| 5,995,290 A | 11/1999 | Noble |
| 5,995,901 A | 11/1999 | Owen et al. |
| 6,005,513 A * | 12/1999 | Hardesty .................. 342/357.34 |
| 6,038,498 A | 3/2000 | Briffe et al. |
| 6,057,786 A | 5/2000 | Briffe et al. |
| 6,075,467 A | 6/2000 | Ninagawa et al. |
| 6,085,129 A | 7/2000 | Schardt |
| 6,112,141 A | 8/2000 | Briffe et al. |
| 6,118,385 A | 9/2000 | Leard et al. |
| 6,181,987 B1 | 1/2001 | Deker et al. |
| 6,188,937 B1 | 2/2001 | Sherry et al. |
| 6,278,913 B1 | 8/2001 | Jiang et al. |
| 6,289,277 B1 | 9/2001 | Feyereisen et al. |
| 6,313,759 B1 | 11/2001 | Musland-Sipper |
| 6,314,343 B1 | 11/2001 | Adams et al. |
| 6,314,370 B1 | 11/2001 | Curtright |
| 6,381,519 B1 | 4/2002 | Snyder |
| 6,381,538 B1 | 4/2002 | Robinson et al. |
| 6,389,333 B1 | 5/2002 | Hansman et al. |
| 6,424,909 B2 | 7/2002 | Kusano et al. |
| 6,443,399 B1 | 9/2002 | Yount et al. |
| 6,449,556 B1 | 9/2002 | Pauly |
| 6,453,236 B1 | 9/2002 | Aoki |
| 6,466,235 B1 | 10/2002 | Smith et al. |
| 6,473,675 B2 | 10/2002 | Sample |
| 6,512,527 B1 | 1/2003 | Barber et al. |
| 6,522,958 B1 | 2/2003 | Dwyer et al. |
| 6,542,796 B1 | 4/2003 | Gibbs et al. |
| 6,633,810 B1 | 10/2003 | Qureshi et al. |
| 6,690,299 B1 | 2/2004 | Suiter |
| 6,696,980 B1 | 2/2004 | Langner et al. |
| 6,707,475 B1 | 3/2004 | Snyder |
| 6,720,891 B2 | 4/2004 | Chen et al. |
| 6,745,113 B2 | 6/2004 | Griffin |
| 6,816,780 B2 | 11/2004 | Naimer et al. |
| 6,856,864 B1 | 2/2005 | Gibbs et al. |
| 6,871,124 B1 | 3/2005 | McElreath |
| 6,909,967 B2 | 6/2005 | Hirano et al. |
| 6,992,596 B2 | 1/2006 | Cole |
| 7,024,287 B2 | 4/2006 | Peckham et al. |
| 7,103,455 B2 | 9/2006 | Subelet et al. |
| 7,148,814 B2 | 12/2006 | Sikora et al. |
| 7,177,731 B2 | 2/2007 | Sandell et al. |
| 7,188,007 B2 | 3/2007 | Boorman et al. |
| 7,203,577 B2 | 4/2007 | Gunn et al. |
| 7,256,710 B2 | 8/2007 | Mumaw et al. |
| 7,321,318 B2 | 1/2008 | Crane et al. |
| 7,363,119 B2 | 4/2008 | Griffin et al. |
| 7,418,319 B2 | 8/2008 | Chen et al. |
| 7,460,029 B2 | 12/2008 | Boorman et al. |
| 7,577,501 B2 | 8/2009 | Tafs et al. |
| 7,751,948 B2 | 7/2010 | Boorman et al. |
| 2003/0025719 A1 | 2/2003 | Palmer et al. |
| 2004/0059474 A1 | 3/2004 | Boorman et al. |
| 2006/0005147 A1 | 1/2006 | Hammack et al. |
| 2008/0316058 A1 | 12/2008 | Chen |
| 2009/0062972 A1 | 3/2009 | Boorman et al. |

FOREIGN PATENT DOCUMENTS

| | | |
|---|---|---|
| FR | 2848306 | 6/2004 |
| WO | WO-2004027732 A1 | 4/2004 |

* cited by examiner

SYSTEMS AND METHODS FOR HANDLING THE DISPLAY AND RECEIPT OF AIRCRAFT CONTROL INFORMATION

CROSS-REFERENCE TO RELATED APPLICATION

This application is a divisional of U.S. patent application Ser. No. 12/197,784, filed Aug. 25, 2008, now issued as U.S. Pat. No. 7,844,372, entitled SYSTEMS AND METHODS FOR HANDLING THE DISPLAY AND RECEIPT OF AIRCRAFT CONTROL INFORMATION, which is divisional of U.S. patent application Ser. No. 10/814,369, filed Mar. 31, 2004, entitled SYSTEMS AND METHODS FOR HANDLING THE DISPLAY AND RECEIPT OF AIRCRAFT CONTROL INFORMATION, which issued on Aug. 26, 2008 as U.S. Pat. No. 7,418,319, which are incorporated herein by reference in their entirety

TECHNICAL FIELD

The present invention is directed generally toward systems and methods for handling the display and receipt of aircraft control information, for example, display media that present operator activatable elements.

BACKGROUND

Modern commercial aircraft make extensive use of computer systems to control aircraft behavior, plan and execute flights, and manage a myriad of other aircraft operations. Most current commercial transport aircraft include a flight management computer (FMC) that tracks flight segments or "legs" en route and can automatically control the aircraft to fly some or all of the segments. A control and display unit (CDU) or similar device provides input to and output from the FMC. Accordingly, pilots can load a series of flight segments into the FMC before a flight, monitor the progress of the flight by reference to the CDU, and/or modify the segments by entering new information via the CDU.

FIG. 1 illustrates a CDU 30 configured in accordance with the prior art and available on a variety of Boeing aircraft. The CDU 30 can include a display screen 31 and associated hardware input keys, including select keys 50 (shown as line select keys 50a and menu select keys 50b) and alphanumeric keys forming a keyboard 21. The display screen 31 includes a plurality of user update fields 33 that are updated by the aircraft operator or initially populated by the FMC, and system update fields 32 that are automatically updated by the FMC based on information received at the user update fields 33. For example, the operator can enter way point identifiers at the user update fields 33. The system can provide direction identifiers and distances between way points, based on the information received at the user update fields 33.

To operate the CDU 30, the operator presses one of the menu select keys 50b to determine which page dataset or menu is presented at the display screen 31. The operator then presses one of the line select keys 50a to select the user update field 33 that will be updated via data that are displayed at a scratch pad 35. If no data are present at the scratch pad 35, then the data in the selected user update field 33 are displayed at the scratch pad 35. The operator next edits information via the keyboard 21 while viewing the information at the scratch pad 35. Alternatively, the operator can enter information presented at the scratch pad 35 without first pressing one of the line select keys 50a. In either case, after the operator reviews the entered information for accuracy, he or she can depress the corresponding line select key 50a to load the information from the scratch pad 35 into the corresponding user update field 33. This information then becomes part of the aircraft flight plan.

One drawback with the arrangement described above with reference to FIG. 1 is that a change to the layout of the hardware input keys or the text identifier on the input keys can significantly increase the cost of upgrading the CDU 30. For example, because the input keys are fixedly positioned at the CDU 30, it can be prohibitively expensive and/or logistically difficult to change the layout of the CDU, for example, to change the size of the display screen 31, the location of the line select keys, or other aspects of the design of the CDU 30. Accordingly, airlines and other aircraft owners may be discouraged from installing system updates that can significantly ease pilot workload and improve the efficiency with which pilots operate their aircraft. As a result, aircraft owners may wait for a substantial period of time before implementing upgrades, and when they do so, they may incur considerable expenses.

SUMMARY

The present invention is directed generally toward systems and methods for handling aircraft control information. A system in accordance with one aspect of the invention includes a display medium coupleable to a flight manager, with the flight manager being configured to receive and direct instructions for automatically controlling aircraft functions at a future time during flight of the aircraft. The system can further include a display controller coupled to the display medium to present at least one operator activatable element (e.g., an icon) at the display medium and update information presented at the display medium when the operator activates the operator activatable element.

In a particular aspect of the invention, the display controller can be operatively coupled to the display medium to present at least one operator activatable icon as well as a control icon (e.g., a cursor). A tracking device can be operatively coupled to the display medium to move the control icon, and the display controller can be configured to update the information presented at the display medium when the operator aligns the control icon with the operator activatable element and activates the tracking device.

A method in accordance with another aspect of the invention includes presenting at a display medium at least one operator activatable element. The method can further include, in response to receiving a signal input by the operator and corresponding to an activation of the operator activatable input, changing at least a portion of the information presented at the display medium. The information can correspond to instructions for automatically controlling aircraft functions at a future time during flight of the aircraft. In particular aspects of the invention, the information can be displayed in a manner generally similar to a manner in which the information is displayed at a control and display unit. Changing at least a portion of the information presented at the display medium can include updating a flight plan list that includes flight segments to be flown at a future time.

DETAILED DESCRIPTION

The following disclosure describes systems and methods for displaying and handling aircraft operation information (e.g., control and status information) aboard an aircraft. Certain specific details are set forth in the following description and in FIGS. 2-7 to provide a thorough understanding of various embodiments of the invention. Well-known structures, systems and methods often associated with handling electronic instructions have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer (e.g., a flight guidance computer). Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, hand-held devices (including palm-top computers, wearable computers, cellular or mobile phones, multiprocessor systems, processor-based or programmable consumer electronics, mini-computers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable computer disks (e.g., removable disks), as well as distributed electronically over networks. Data structures and transmissions of data particular to aspects of the invention are also encompassed within the scope of the invention.

Figure 2:
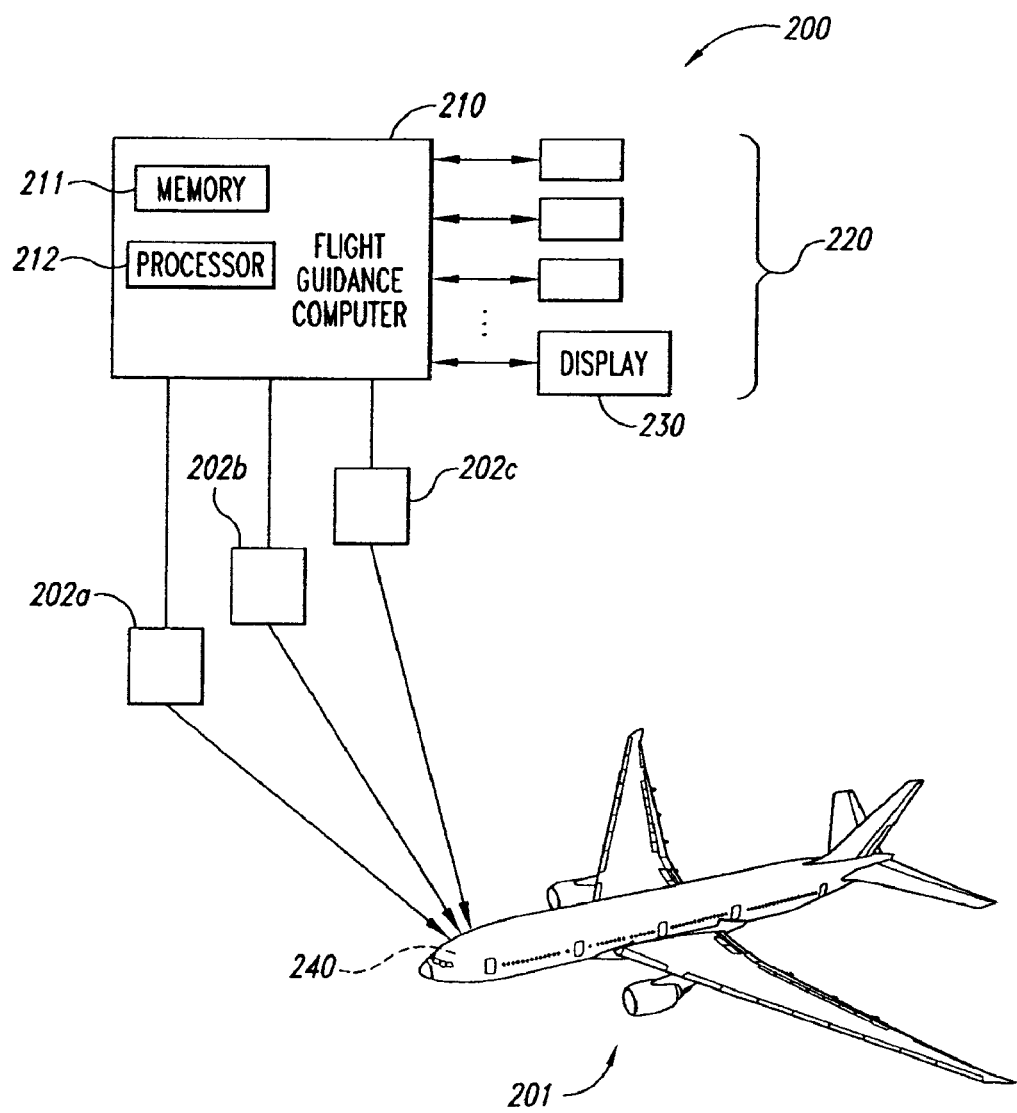
FIG. 2 is a partially schematic illustration of a system for controlling an aircraft in accordance with an embodiment of the invention.

FIG. 2 is a schematic illustration of an aircraft 201 having a system 200 configured to display and receive information in accordance with an embodiment of the invention. Portions of the system 200 can be housed at a flight deck 240 of the aircraft 201 for access by an operator (e.g., a pilot). The aircraft 201 can have a fixed wing configuration (as shown in FIG. 2) or other configurations (e.g., rotary wing configurations). In one aspect of this embodiment, the system 200 can include input/output devices 220 via which the operator can provide information to a computer (e.g., a flight guidance computer 210). The flight guidance computer 210 can include a memory 211 and a processor 212 for processing the information received. The input/output devices 220 can also include a display 230 at which information is presented to the operator. The display 230 can include icons or other displayed elements in lieu of hardware switches, which can allow the operator to easily enter information and review the information once entered. This arrangement can also allow the system 200 to be easily updated, thereby taking advantage of available upgrades without requiring hardware changes.

The flight guidance computer 210 can include a flight management computer, autoflight computer, autopilot, and/or autothrottle and can be linked to one or more aircraft control systems 202, shown in FIG. 2 as a lateral motion or roll control system 202a, a vertical motion controller 202b, and an air speed or engine control system 202c to control the aircraft direction, altitude and speed. The flight guidance computer 210 directs the operation of the control systems 202 either automatically or by providing guidance cues to the operator who then manually controls the aircraft 201. Aspects of the operator's interactions with the system 200 are described in greater detail below with reference to FIGS. 3-6.

Figure 3:
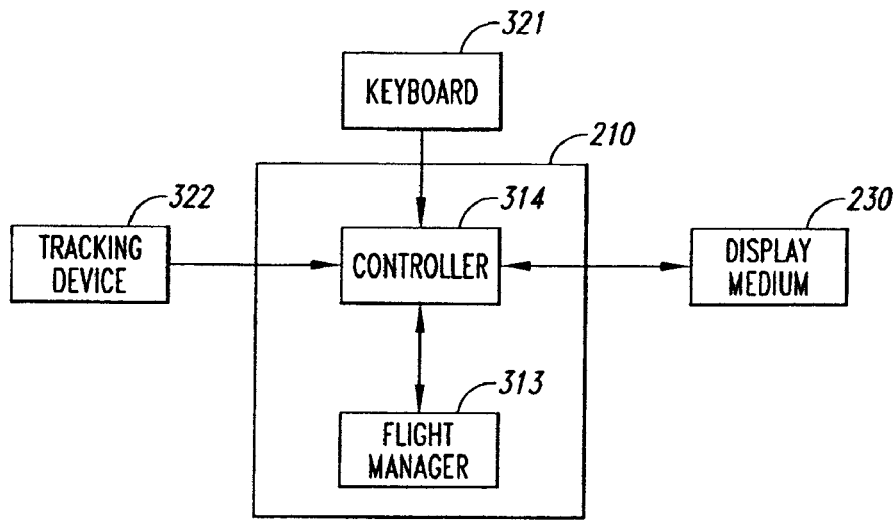
FIG. 3 is a schematic illustration of a flight guidance computer configured to handle aircraft operation information in accordance with an embodiment of the invention.

FIG. 3 schematically illustrates an embodiment of the flight guidance computer 210 described above with reference to FIG. 2. The flight guidance computer 210 can include a keyboard 321 (e.g., for entering alphanumeric characters) and a tracking device 322 (e.g., for moving a control element, including a cursor). A controller 314 can receive information from the keyboard 321 and the tracking device 322 (or another input device), as well as a flight manager 313 (which processes the information), and can present at least some of the information at the display medium 230. The controller 314 can also receive information via the display medium 230, as described below with reference to FIGS. 4-6.

Figure 4:
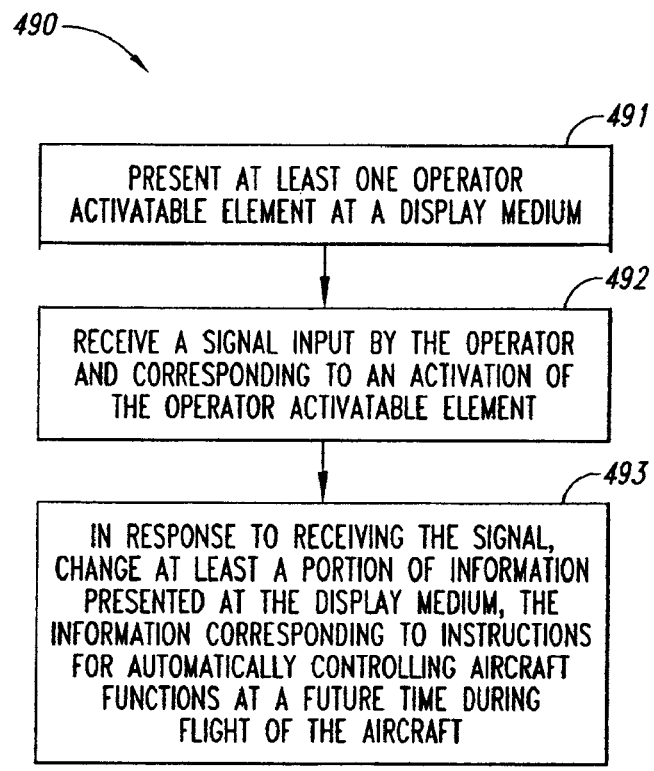
FIG. 4 is a flow chart illustrating a method for handling aircraft operation information in accordance with an embodiment of the invention.

FIG. 4 is a flow chart illustrating a method 490 in accordance with an embodiment of the invention. The method 490 can include presenting at least one operator activatable element at a display medium (process portion 491). The method can further include receiving a signal input by the operator and corresponding to an activation of the operator activatable element (process portion 492). For example, the operator activatable element can include an emulation of a mechanical switch or button which appears on the display medium. The emulation can be driven by software or other instructions residing on a computer-readable medium. The system can receive the signal input by the operator when the operator highlights the activatable element and activates the activatable element, for example, by aligning a cursor or other control element with the activatable element and entering a keystroke, mouse click, or other appropriate signal. In process portion 493, the process 490 includes changing at least a portion of the information presented at the display medium in response to receiving the signal. The information can correspond to instructions for automatically controlling aircraft functions at a future time during flight of the aircraft. For example, the instructions can correspond to legs of a flight plan that are automatically implemented at a particular time or when a particular en route way point is reached. These instructions can be handled by the flight guidance computer 210 (FIG. 2), which can also handle instructions that are to be implemented immediately or nearly immediately (e.g., "direct to" instructions).

Figure 1:
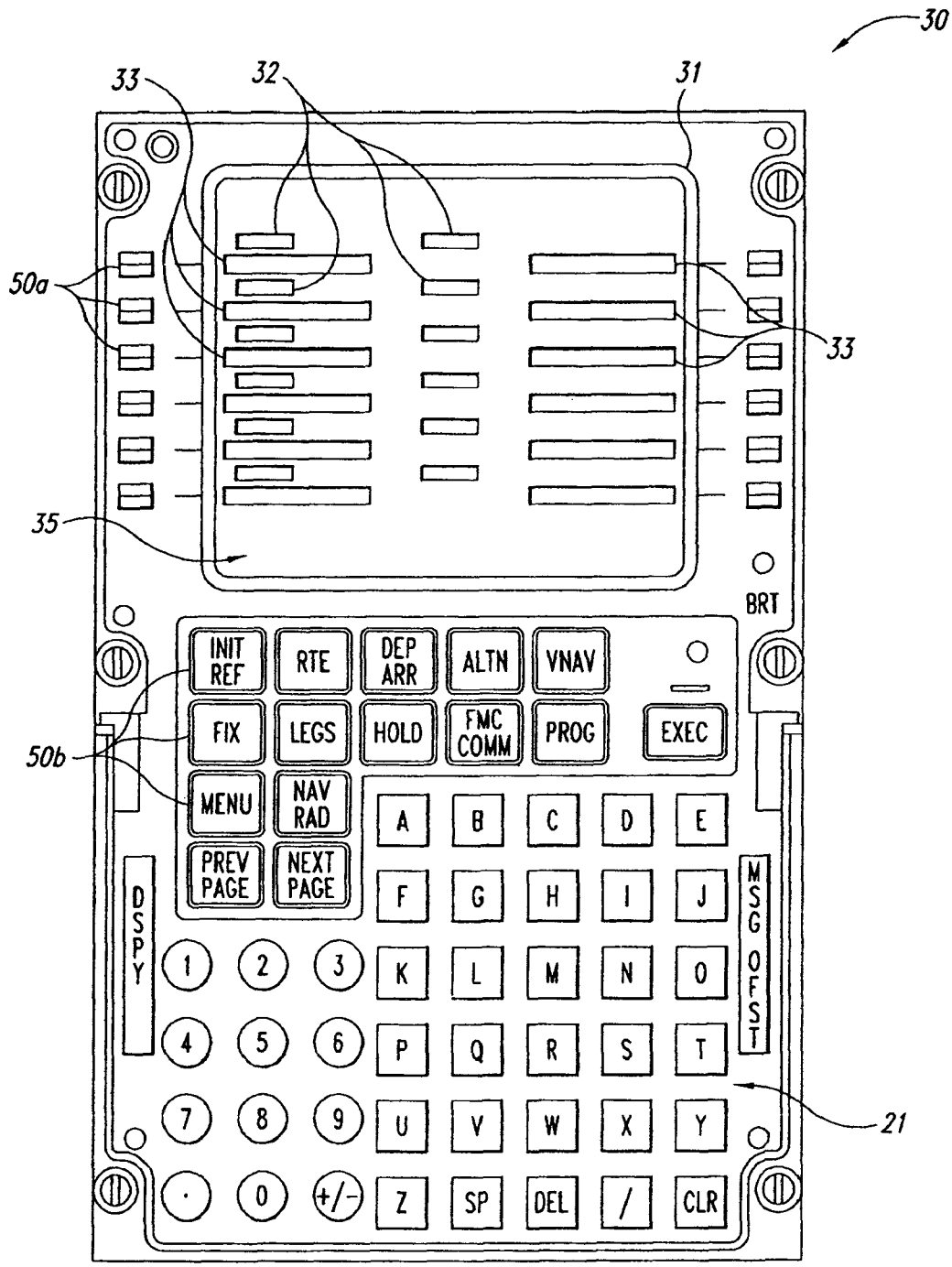
FIG. 1 is a partially schematic illustration of a CDU configured in accordance with the prior art.
Figure 5:
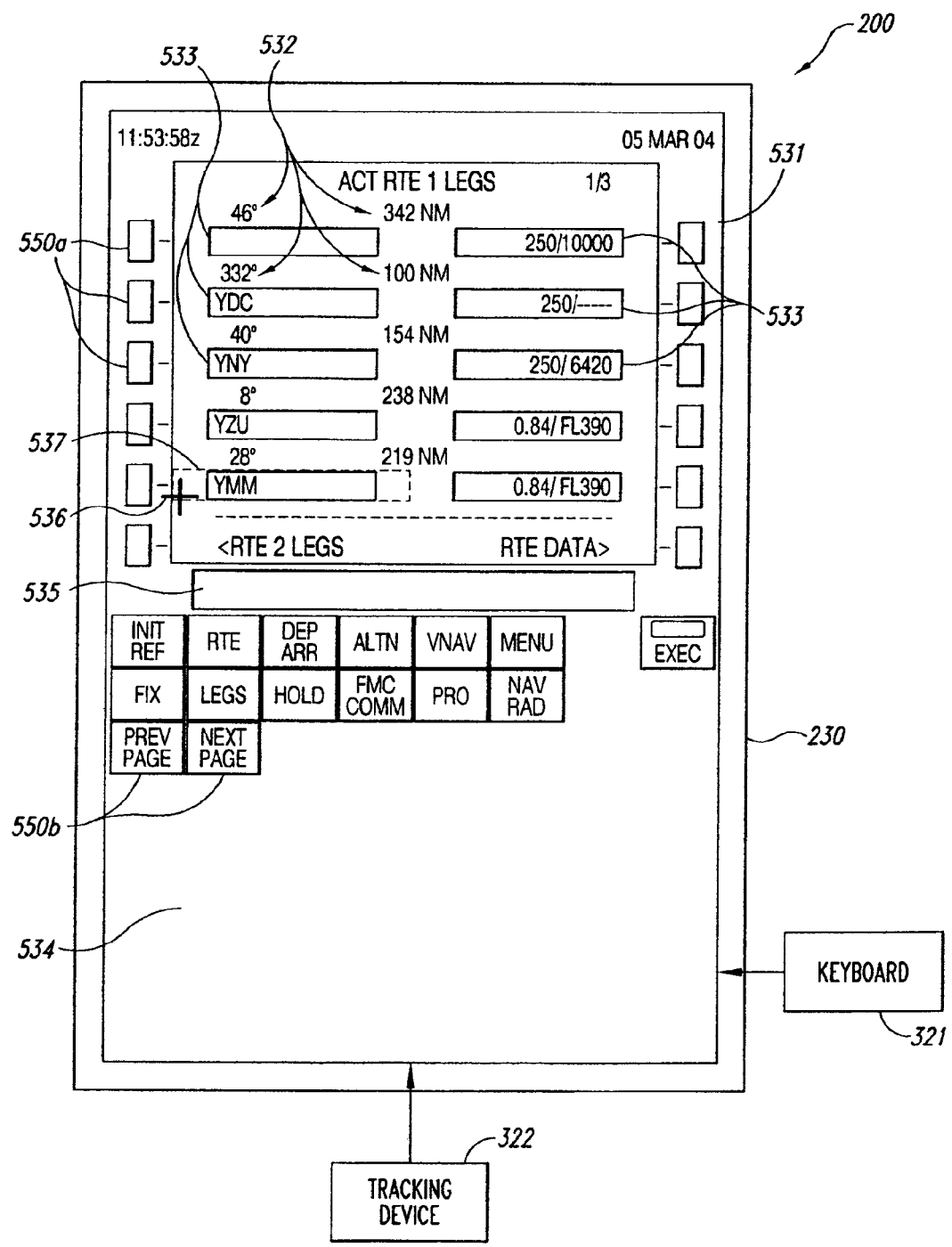
FIG. 5 is a partially schematic illustration of a display medium and associated input/output devices configured in accordance with an embodiment of the invention.

FIG. 5 is an illustration of the display medium 230 presenting aircraft control information and operator activatable input elements in accordance with an embodiment of the invention. In one aspect of this embodiment, the display medium 230 includes a screen 531 (e.g., an LCD screen) presenting a plurality of operator activatable elements (shown as line select elements 550a and menu select elements 550b). The operator activatable elements 550 can have the appearance of hardware switches so as to provide a sense of familiarity to operators who are accustomed to entering information at a CDU generally similar to the one described above with reference to FIG. 1. In fact, the overall appearance of the display presented at the display medium 230 can be similar to that of the CDU described above with reference to FIG. 1. Accordingly, the display medium 230 can present system update fields 532 and operator update fields 533. The system update fields 532 can present flight leg information (e.g., aircraft direction and distance between way points), and the operator update fields 533 can include way point identifier fields and aircraft speed/altitude fields. Each line select element 550a can be aligned with one of the operator update fields 533 to make it clear to the operator which operator update field 533 will be updated when a particular line select element 550a is activated.

To select or activate one of the operator update fields 533 for updating, the operator can use the tracking device 322 to move a control element 536 (e.g., a cursor) into alignment with one of the line select elements 550a, and then optionally provide an additional signal. For example, the operator can "click" a button on the tracking device 322 or enter a keystroke at the keyboard 321. In another embodiment, the operator can scroll through the available operator update fields 533, e.g., by activating an "arrow" key at the keyboard 321 or a tabber knob on or off the keyboard 321, and then provide an additional signal when the desired operator update field 533 is reached. In either arrangement, the activated operator update field 533 can be displayed in a different manner than the non-activated fields, for example, with highlighting 537.

When the operator selects one of the selectable operator update fields 533, any information currently present at the selected operator update field 533 can appear in a preview field 535 for editing. The operator can edit the information displayed in the preview field 535 with the keyboard 321 and, after reviewing the information for accuracy, can submit the information to the corresponding operator update field 533. In one embodiment, the information can be submitted by entering a keystroke at the keyboard 321, and in another embodiment the information can be submitted by clicking a button on the tracking device 322 or by another method. In any of these arrangements, once the information has been submitted, the system 200 can check the information for accuracy. If the information is accurate, the system can load the information into the flight plan or other destination (e.g., program, routine or database). Optionally, the system 200 can display an error message in a manner generally similar to that described in copending U.S. application Ser. No. 12/824,052 entitled "Methods and Systems for Displaying Assistance Messages to Aircraft Operators," filed concurrently herewith.

In other embodiments, the system 200 can receive information in different manners. For example, the operator can initially enter information via the keyboard 321 to appear at the preview field 535, without first selecting one of the operator update fields 533. After entering the information at the preview field 535, the operator can then select one of the operator update fields 533 to receive the information from the preview field 535.

The display medium 230 shown in FIG. 5 illustrates a "legs" page identifying upcoming segments or legs of a flight plan that are executed sequentially at a future time (e.g., as the aircraft overflies successive way points). The display medium 230 can display other information when the operator activates the appropriate menu select element 550b. The menu select elements 550b displayed at the display medium 230 can operate in a manner generally similar to that of the line select elements 550a, and can be provided in lieu of the hardware switches available on existing systems. In still further embodiments, other input devices can also be presented at the display medium 230. For example, the alphanumeric keys of the keyboard 321 can be presented as operator activatable elements, either at the display medium 230 shown in FIG. 5 or, if space is not available there, at another display medium.

Figure 6:
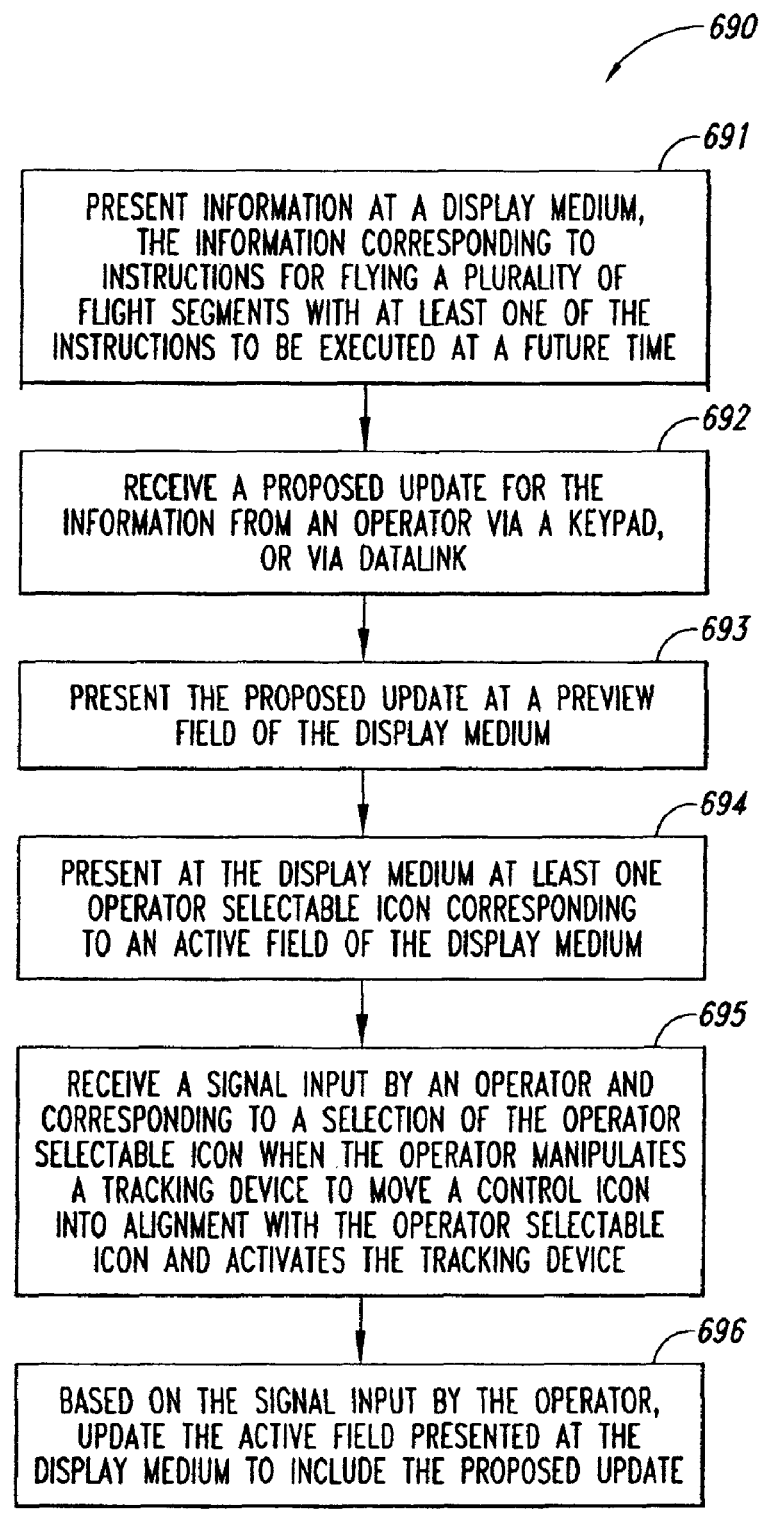
FIG. 6 is a flow chart illustrating a method for handling aircraft operation information in accordance with another embodiment of the invention.

FIG. 6 illustrates a process 690 for handling aircraft control information in accordance with another embodiment of the invention, for example, by using a system having aspects generally similar to those described above with reference to FIG. 5. The process 690 can include presenting information at a display medium, with the information corresponding to instructions for flying a plurality of flight segments and with at least one of the instructions to be executed at a future time (process portion 691). In process portion 692, the system receives a proposed update for the information from an operator via a keypad, for example, the keypad 321 described above with reference to FIG. 5, or the information can be received via a datalink. The proposed update can be presented at a preview field of the display medium (process portion 693), for example, the preview field 535 of the display medium 230 shown in FIG. 5. In process portion 694, at least one operator selectable icon corresponding to an active field of the display medium can be presented at the display medium (e.g., one of the line select elements 550a or the menu select elements 550b shown in FIG. 5). In process portion 695, the system receives a signal input by an operator and corresponding to a selection of the operator selectable icon when the operator manipulates a tracking device to move a control icon (e.g., a cursor) into alignment with the operator selectable icon and activates the tracking device. In process portion 696, the active field presented at the display medium is updated to include the proposed update based on the signal input by the operator.

Figure 7:
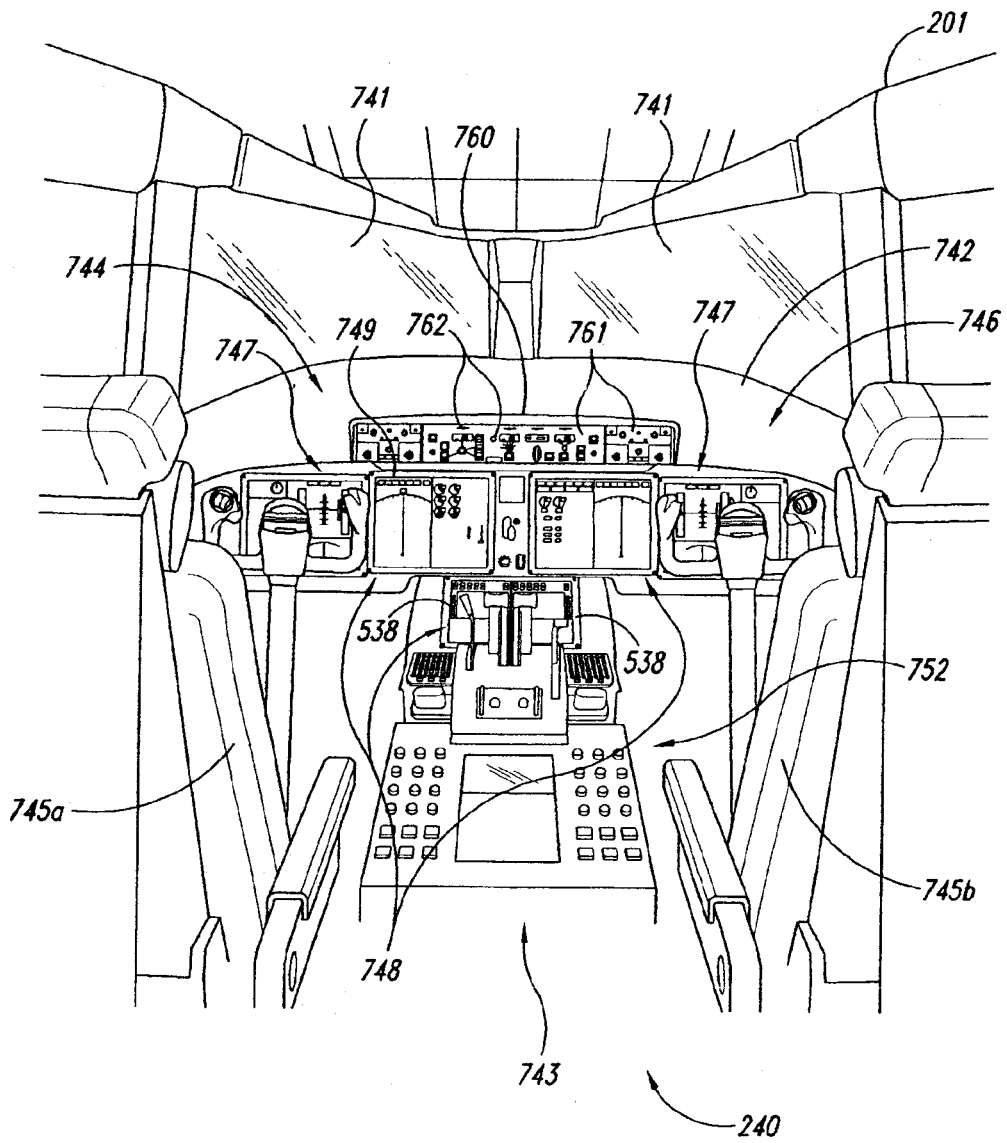
FIG. 7 is a partially schematic, isometric illustration of a flight deck in which systems in accordance with embodiments of the invention can be housed.

FIG. 7 illustrates a flight deck 240 having displays and controls associated with an embodiment of the system 200 described above. The flight deck 240 can include forward windows 741 providing a forward field of view from the aircraft 201 for operators seated in a first seat 745a and/or a second seat 745b. In other embodiments, the forward windows 741 can be replaced with one or more external vision screens that include a visual display of the forward field of view out of the aircraft 201. A glare shield 742 can be positioned adjacent to the forward windows 741 to reduce the glare on one or more flight instruments 744 positioned on a control pedestal 743 and a forward instrument panel 246.

The flight instruments 744 can include primary flight displays (PFDs) 747 that provide the operators with actual flight parameter information, and multifunction displays (MFDs) 748 that display other operator-selectable information. For example, one or more of the MFDs 748 can present a navigation display 749 containing navigational information. The flight guidance computer 210 described above with reference to FIG. 2 can include several linked and/or unlinked computers, including a flight management computer (FMC) 752.

One of the MFDs 748 can include two side-by-side display fields 538 (generally similar to the display field described above with reference to FIG. 5) positioned on the control pedestal 743. In other embodiments, the display fields 538 can be presented singly or together at any of the MFDs 748. The display fields 538 provide an interface for each of the operators to the flight management computer 752. Accordingly, the display fields 538 can include flight plan list displays and other displays for presenting information corresponding to upcoming segments of the aircraft flight plan. The keyboards 321 allow the operators to enter information corresponding to the segments. Further details of controls for side-by-side display fields are included in copending U.S. application Ser. No. 10/815,034 entitled "Methods and Systems for Controlling the Display of Information at an Aircraft Flight Deck," filed concurrently herewith and incorporated herein in its entirety by reference. The flight guidance computer 210 can further include a mode control panel (MCP) 760 having input devices 761 for receiving inputs from the operators, and a plurality of displays 762 for providing flight control information to the operators.

One feature of embodiments of the system 200 described above with reference to FIGS. 2-7 is that at least some of the input devices for controlling, updating, or implementing aircraft functions that are to be executed at a future time are presented at a display medium, rather than as hardware switches. One advantage of this arrangement is that the amount of information displayed and/or the manner in which information is displayed at the display medium 230 can be altered, updated, or otherwise changed with relative ease and without requiring hardware modifications to the flight deck. For example, the size, appearance, number and/or location of the operator activatable elements can be changed by changing the computer-based instructions that control the presentation of these elements at the display media. Accordingly, as advances are made in information processing and display techniques, these advances can be more readily implemented on existing flight decks without necessarily requiring hardware upgrades or by implementing relatively simple hardware upgrades.

Another advantage of the foregoing features is that the inventory of spare hardware parts can be reduced because the mechanical switches of existing CDUs can be replaced with software-driven switch icons presented at the display media. Should a system upgrade or replacement become necessary, the appropriate instructions can be downloaded to the aircraft either directly at the aircraft itself or via a remote link, again without requiring a change in hardware.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined or eliminated in other embodiments. Accordingly, the invention is not limited except as by the appended claims.

We claim:

1. A method for handling aircraft control information, comprising:
presenting information at a display medium, the information corresponding to instructions for flying a plurality of flight segments with at least one of the instructions to be executed at a future time during aircraft flight;
presenting at the display medium at least one operator selectable element;
receiving a signal input by the operator and corresponding to a selection of the operator selectable element; and
based on the signal input by the operator, changing at least a portion of the information presented at the display medium.

2. The method of claim 1, further comprising:
receiving an input from the operator corresponding to a proposed update for information presented at the display medium; and
presenting the input at a preview field of the display medium, and wherein changing at least a portion of the information presented at the display medium includes updating the information to include the input.

3. The method of claim 1 wherein presenting at least one operator activatable element includes presenting an icon representing a switch.

4. The method of claim 1 wherein presenting at least one operator selectable element includes presenting an icon representing a switch.

5. The method of claim 1 wherein receiving a signal includes receiving a signal when the operator activates the operator selectable element by manipulating a tracking device to align a control element with the operator selectable element and activating the tracking device.

6. The method of claim 1, further comprising displaying the information corresponding to the instructions in a manner generally similar to a manner in which the information is displayed at an aircraft control display unit.

7. The method of claim 1 wherein presenting at least one operator selectable element includes presenting a plurality of operator selectable elements arranged in two columns.

8. The method of claim 1 wherein presenting at least one operator selectable element includes presenting a plurality of operator selectable elements and highlighting one of the at least one operator selectable elements upon receiving the signal input by the operator.

9. The method of claim 1 wherein presenting at a display medium includes displaying at a computer screen.

10. The method of claim 1 wherein changing at least a portion of information presented at the display medium includes updating a flight plan list that includes the plurality of flight segments.

11. The method of claim 1, wherein receiving the signal includes receiving the signal when the operator strikes an input key.

12. A computer-implemented method for handling aircraft control information, comprising:
presenting information at a display medium, the information corresponding to instructions for flying a plurality of flight segments with at least one of the instructions to be executed at a future time;
receiving a proposed update for the information from an operator via a keypad;
presenting the proposed update at a preview field of the display medium;
presenting at the display medium at least one operator selectable icon corresponding to an active field of the display medium;
receiving a signal input by an operator and corresponding to a selection of the operator selectable icon when the operator manipulates a tracking device to move a control icon into alignment with the operator selectable icon and activates the tracking device; and
based on the signal input by the operator, updating the active field presented at the display medium to include the proposed update.

13. The method of claim 12, further comprising automatically implementing the instruction to change a behavior of the aircraft.

14. The method of claim 12 wherein updating at least a portion of the information includes updating a numerical value.

15. The method of claim 1, further comprising:
receiving an input corresponding to a proposed value to be submitted to the flight manager;
displaying the input at a preview display field; and upon receiving an authorizing signal by the operator, submitting the proposed update to a flight manager, the flight manager being configured to receive and direct instructions for automatically controlling aircraft behavior at a future time.

16. The method of claim 12 wherein presenting at least one operator selectable icon includes presenting a plurality of operator selectable icons, with a first one of the operator selectable icons displayed in a first manner and a second one of the operator selectable icons displayed in a second manner visually different than the first manner, with the second operator selectable icon corresponding to the active field.

17. The method of claim 12 wherein presenting at least one operator selectable icon includes presenting an icon representing a switch.

18. The method of claim 12 wherein presenting the information includes presenting the information in a manner generally similar to a manner in which the information is displayed at an aircraft control display unit.

19. The method of claim 12 wherein presenting at least one operator selectable icon includes presenting a plurality of operator activatable elements arranged in two columns.

20. The method of claim 12 wherein presenting at least one operator selectable icon includes presenting a plurality of operator selectable icons and highlighting one of the at least one operator selectable icons upon receiving an authorizing signal by the operator.

\* \* \* \* \*